Feb. 9, 1971    R. SCHNEIDER    3,561,305
TUBE HOLDER

Filed May 20, 1969    2 Sheets-Sheet 1

INVENTOR
REINHARD SCHNEIDER

BY McGlew and Toren
ATTORNEYS ated Feb. 9, 1971

United States Patent Office 3,561,305
Patented Feb. 9, 1971

3,561,305
TUBE HOLDER
Reinhard Schneider, Ostermundigen, Switzerland, assignor to Polytype AG, Freiburg, Switzerland
Filed May 20, 1969, Ser. No. 826,235
Claims priority, application Sweden, May 24, 1968, 7,010/68
Int. Cl. B23b 33/00
U.S. Cl. 82—40                                5 Claims

ABSTRACT OF THE DISCLOSURE

A tube holder construction for a multiple stationed automatic lathe includes a mandrel centrally positioned between a clamping assembly held on a turntable. The tube to be held by the holder is engaged over the mandrel and over rollers carried by the mandrel in a plurality of circumferentially spaced slots and projecting outwardly therefrom. The rollers are shaped or mounted so that they present a tapered conical gripping surface having an entrance end of smaller dimension for facilitating the positioning of the tube thereover. The clamping member which is carried by the turntable includes a ring which is adapted to engage over the tube at a location overlying the rollers of the mandrel.

SUMMARY OF THE INVENTION

This invention relates in general to the construction of clamping devices or holders and in particular to a new and useful tube holder for a lathe.

Tubes which are extruded are further processed on a so called automatic tube lathe in which the tube head is turned to measure and the thread is rolled on the tube. Frequently the beveled tube shoulder is faced or grooved with a turning tool and subsequently the tube shell is cut to the exact length. When the tubes are placed on a lathe mandrel to accomplish this work they are usually carried on a turntable which rotates the tubes in a step by step manner into association with one or more operating tools at various working stations. The tubes are moved from one station to the other as the turntable holding the tubes turns about an axis. The tubes are retained on the mandrel by mandrel elements which move into the head opening of the tube and are locked there by claws. The sharp claws penetrate into the inner wall of the head opening and the formation of chips or scratches on the tube wall is unavoidable. However, the formation of chips cannot be tolerated when the tubes are to be employed for food or medicinal purposes because the scratches or chips retain the contents so that after the tube is emptied the retained particles can mix with the contents of a subsequently added material.

In accordance with the present invention there is provided an improved structure which includes a mandrel having a plurality of milled slots which are spaced around its circumference and which receive clamping rollers which are formed or oriented to produce a conical engagement to surface. A supporting ring carried on the turntable includes clamping bearings which carry an inner ring which is adapted to bear against a tube positioned on the mandrel at a location overlying the conical gripping rollers.

Accordingly it is an object of the invention to provide an improved tube holder, particularly for use on an automatic lathe, which includes a mandrel which is adapted to pass into the tube and which includes a plurality of rollers which project from the periphery thereof and which are tapered in a conical fashion toward one end to permit entrance of the tube, and further including a clamping bearing adapted to be mounted on the turntable which carries a ring which is adapted to bear against the outside surface of the tube location overlying the clamping rollers.

A further object of the invention is to provide a tube holder which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figure 1:
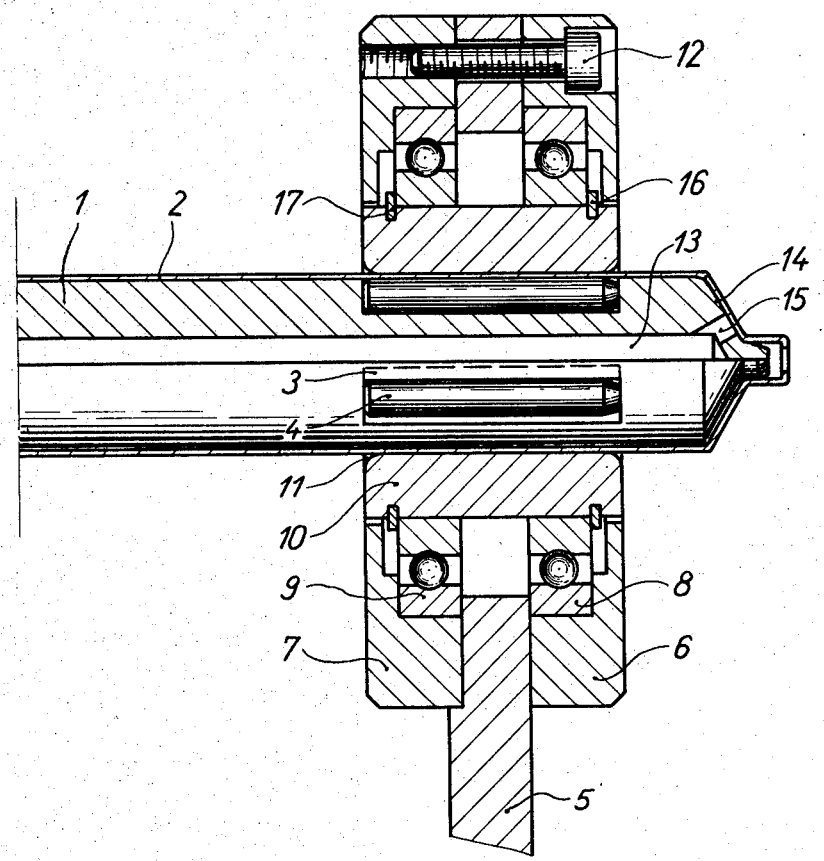
FIG. 1 of the drawings is a cross sectional view of an automatic lathe turntable having a tube holder constructed in accordance with the invention.

Referring to the drawing in particular the invention embodied therein comprises a tube holder which includes a lathe mandrel 1 on which the tubes 2 to be processed are arranged. In accordance with the invention the lathe mandrel 1 is provided with a plurality of milled slots 3 which are arranged around its outer periphery and which carry a single clamping roller 4.

The exterior of the tube 2 is engaged by a clamping element mounted on a lathe turntable 5 which includes two outer clamping bearings 6 and 7 which carry ball bearings 8 and 9. A clamping ring 10 is retained by the inner race of the ball bearings 8 and 9 and it bears against the tube 2 which is being processed. The clamping bearings 6 and 7 are secured to the turntable by means of securing screws or bolts 12.

The mandrel 1 advantageously carries a bore 13 which opens at least in a single bore 15 at an end shoulder 14. The bore 15 permits the escape of air when the tube 2 is attached to the mandrel and if desired it is advantageously connected to means for blowing air through the bore 13 and the bore 15 to dislodge a tube from the clamping device after it has been processed. The ring 10 is held in a longitudinal direction by retaining rings 16 and 17.

Figure 2:
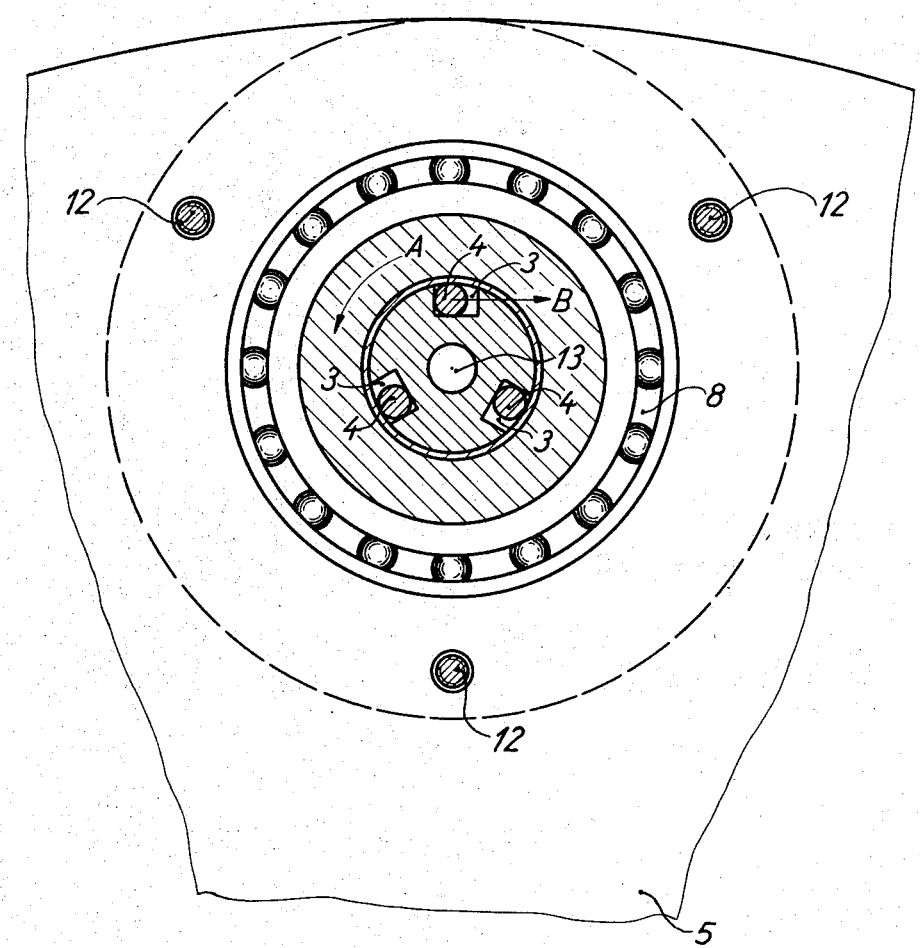
FIG. 2 is a cross sectional view of FIG. 1 at the forward surface of turntable 5.

The method of operation of this device is as follows:

Since the clamping rollers 4 are conical and they taper inwardly toward the inlet side of the tube to be processed tubes 2 can be pushed over the clamping rollers 4 and onto the lathe mandrel 1 and through the centering ring 10. If the tube 2 rotates with the mandrel 1 in a direction of rotation with the arrow A as indicated in FIG. 2 the clamping rollers 4 act in a direction of the arrow B indicated in this figure so that the tubes 2 are rigidly connected with the mandrel 1 and turn with it without slip. The ring 10 prevents the shell 2 from being deformed at pressure points by the clamping rollers. The tubes 2 may be detected by braking the mandrel 1 or by changing its direction of rotation.

What I claim is:

1. A tube holder comprising a mandrel, a plurality of rollers arranged around the periphery of said mandrel and having a taper toward one end for the receipt of a tube over this end, and clamping bearing means adapted to be connected to a moving machine part and including an inner rotatable ring of a size to engage over the exterior of a tube being processed for aiding and engaging the tube to be processed with the mandrel for rotation therewith.

2. A tube roller according to claim 1, wherein said clamping bearing means includes first and second bearing plates adapted to engage around a turntable, and bolt means for securing said plates together.

3. A device according to claim 2, including roller bearing means carried by said first and second clamping plates, said ring being carried by the inner one of said roller bearings.

4. A tube holder according to claim 3, wherein said mandrel includes a bore therethrough having an opening at the entrance end of said mandrel, the tube being processed being adapted to force air ahead of it through the bore, said bore being adaptable to blow air therethrough to dislodge the tube from said mandrel.

5. A tube holder according to claim 4, wherein said mandrel includes a plurality of circumferentially spaced recesses, each of said recesses carrying a clamping roller.

References Cited
UNITED STATES PATENTS

| | | | |
|---|---|---|---|
| 2,101,846 | 12/1937 | Goordman | 82—44 |
| 2,114,272 | 4/1938 | Temple | 82—912X |
| 2,395,365 | 2/1946 | Wilson et al. | 82—38X |

LEONIDAS VLACHOS, Primary Examiner

U.S. Cl. X.R.

82—38; 269—49